United States Patent [19]

Matsuoka et al.

[11] Patent Number: 4,579,705
[45] Date of Patent: Apr. 1, 1986

[54] PROCESS FOR PRODUCING CERAMIC PRODUCTS

[75] Inventors: Hideyuki Matsuoka, Tokyo; Hajime Tai; Yuji Yoshida, both of Yokohama; Koichi Inoue, Tokyo; Toshiharu Murayama, Yokohama, all of Japan

[73] Assignee: Tokyo Shibaura Denki Kabushiki Kaisha, Kawasaki, Japan

[21] Appl. No.: 554,808

[22] Filed: Nov. 23, 1983

[30] Foreign Application Priority Data

Nov. 26, 1982 [JP] Japan ................................. 57-207243

[51] Int. Cl.⁴ ............................................. B23B 11/00
[52] U.S. Cl. .................................. 264/66; 51/283 R; 264/63; 264/67; 416/241 B
[58] Field of Search ............................. 264/63, 66, 67; 416/241 B; 51/283 R

[56] References Cited

U.S. PATENT DOCUMENTS

| | | |
|---|---|---|
| 2,735,155 | 2/1956 | Glaser .................................... 264/67 |
| 3,402,024 | 9/1968 | Marshall ............................... 264/67 |
| 3,778,231 | 12/1973 | Taylor .................................... 264/66 |
| 3,988,866 | 11/1976 | Booher, Jr. ...................... 416/241 B |

FOREIGN PATENT DOCUMENTS 54-32006 11/1979 Japan .

OTHER PUBLICATIONS

Halcomb et al., Ceramic Cutting Tools for Machining Unsintered Compacts of Oxide Ceramics, in Ceramic Bulletin, vol. 61, No. 12, 1982, pp. 1311–1314.

Primary Examiner—James Derrington
Attorney, Agent, or Firm—Schwartz, Jeffery, Schwaab, Mack, Blumenthal & Evans

[57] ABSTRACT

A process for producing ceramic products such as turbine rotors comprises the steps of contouring a prefired ceramic roughly or primarily formed workpiece into a desired shape by means of a rod-shaped cutting tool having a working end or tip to which abrasive particles have been secured, said tool being rotated about its axis; subjecting the contoured surface of said workpiece to an abrasive finishing; and thereafter firing said workpiece thus finished.

8 Claims, 11 Drawing Figures

PROCESS FOR PRODUCING CERAMIC PRODUCTS

BACKGROUND OF THE INVENTION

This invention relates generally to processes for producing ceramic products. More particularly, this invention relates to a process for producing a ceramic product wherein a ceramic material is worked by a machining method by which the material can be contoured into a complex or intricate shape, and the thus-formed article is fired.

Ceramic products comprising fired articles of ceramic materials such as oxides, nitrides, carbides, borides and silicides have excellent thermal, chemical, mechanical and electromagnetical characteristics and therefore are used in a variety of ways. Moreover, the utilization fields thereof are being continually enlarged. However, these ceramic products are generally hard and brittle, and therefore it is difficult to form them into desired shapes after firing or sintering. Thus, such ceramic products are accompanied by a processing drawback. Therefore, the ceramic material powder is formed into a desired shape before firing and then fired to obtain a ceramic product having any of a variety of shapes.

Hitherto, cast molding, rubber pressing, injection molding, hot pressing and the like have been used as methods of molding ceramic materials such as oxides. However, the molding methods for producing products having a complex shape with high precision are restricted to cast molding or casting, injection molding and the like.

In the case of casting, a blend of ceramic starting materials is mixed with a suitable medium to prepare a slip or slurry, and this slip is cast into a mold having a desired shape while imparting fluidity to the slip to mold the ceramic material therein. However, in the case of such a forming method, the interior of the formed product tends to be heterogeneous, the casting mold used is expensive, and the fabrication thereof is time consuming. Therefore, in the case of production of products of numerous types each in a small amount, such a process is disadvantageous in that the production cost is very high.

In the case of injection molding, a small amount of a plasticizer and a releasing agent are blended into the ceramic starting material powder, and the resulting mixture is heated in a heating cylinder to impart plasticity thereto and injected into a mold by a pressure plunger to mold the mixture. However, such a molding method presents the following problems. Internal stress is liable to be generated in the workpiece during molding, and cracking may occur during the subsequent firing. Further, as with casting, the mold is expensive and the fabrication thereof is time consuming. Therefore, in the case of production of products of various types in small amounts, such an injection molding is unsuitable.

If ceramics could be worked by a machining technique used in the forming of metals, wood and the like, it would be possible to carry out numerous-type, small-quantity production of the ceramic products. The prior art process of machining ceramics comprises forming (i.e., primary forming) a ceramic starting material powder by any of various methods, semi-drying, drying or biscuiting the formed structure and thereafter carrying out turning or milling by cutting tools provided with abrasion resistant materials such as tungsten carbide and sintered alumina.

While this prior art process of machining ceramics can be applied in forming products having simple shapes with features such as holes, grooves, planes and curved surfaces via rotational machining, the process as described above has not been successfully used in forming products having complex shapes such as turbine rotors having complex and thin portions (blades). The reasons for this are thought to be as follows. As described hereinbefore, in the case of the prior art machining process, the strength of the product of primary forming is low, and therefore the presence of thin formed portions inevitably results in a loss of yield due to breakage. Furthermore, the prior art process of machining ceramics as described above is unsuitable for precision forming.

SUMMARY OF THE INVENTION

An object of the present invention is to provide a process for producing ceramic products by which products having complex shapes can be formed.

We have carried out studies directed toward the attainment of this object. As a result, we have found that precision forming of a ceramic article of complex shape is possible by first prefiring an article of primary forming (roughly formed structure) of ceramic material to obtain a prefired structure having a strength of an order such that durability is attained even when thin-wall portions thereof are formed, sculpturing or contouring this article by machining with a rotating, rod-shaped cutting tool having abrasive particles bonded thereto which produce little heat or do not readily adhere to the workpiece being cut during the machining, and thereafter carrying out finishing and final firing of the article. The present invention is based on this discovery. More specifically, the process for producing a ceramic product according to the present invention includes the steps of:

(a) contouring a prefired ceramic roughly formed workpiece into a desired shape by means of a rod-shaped cutting tool having a working tip bearing abrasive particles secured to the surface thereof, said cutting tool being rotated about the axis thereof;

(b) abrasive finishing the contoured surface of said workpiece thus contoured; and (c) firing said workpiece thus finished.

DETAILED DESCRIPTION OF THE INVENTION

Figure 1:
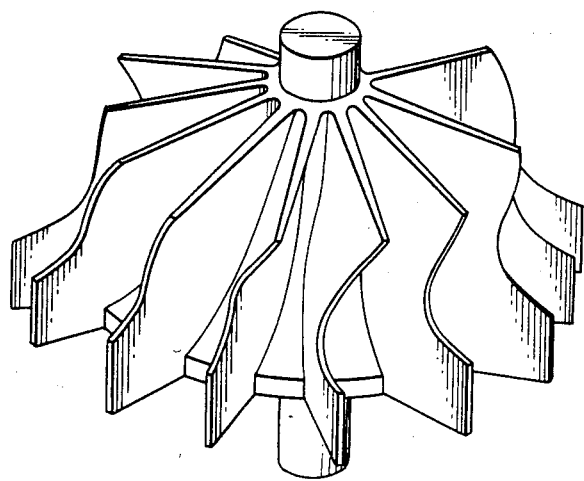
FIG. 1 is a perspective view of an example of a turbine rotor produced by the process of this invention and shown in its state after completion.
Figure 2:
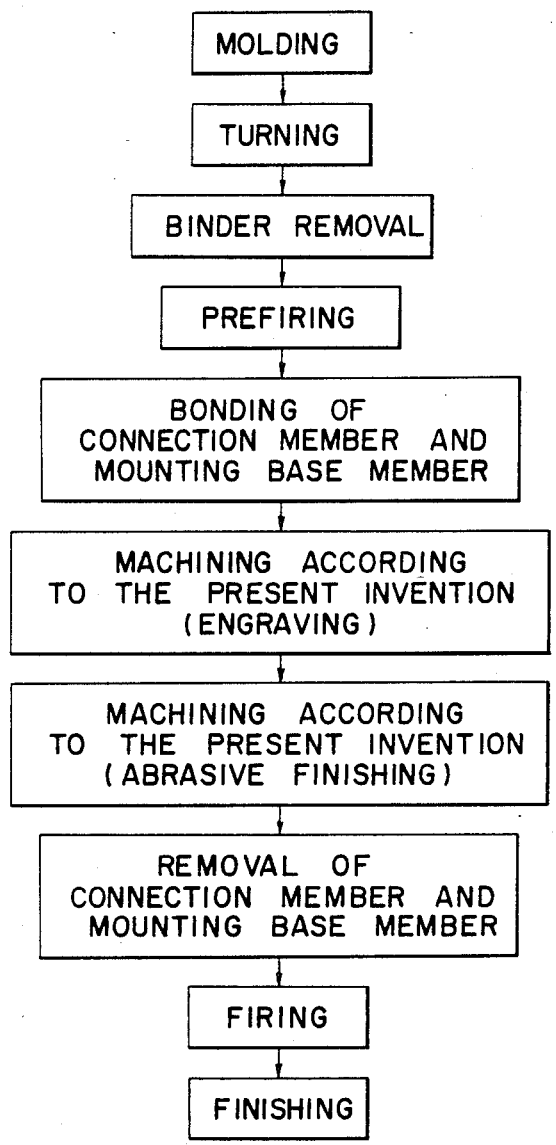
FIG. 2 is a block diagram showing the sequence of steps in an embodiment of this invention.

In the discussion which follows, the process according to the present invention will be described as it would be carried out to produce, for example, a turbine rotor having a complex shape as shown in FIG. 1. The sequential steps are indicated generally in FIG. 2.

For example, from 7 to 23 parts by weight of paraffin is added to and mixed with 100 parts by weight of silicon nitride powder of a particle size of from 200 to 400 mesh to obtain a blend of ceramic starting materials. The resulting blend is compressed at room temperature under a pressure of from 1 to 2 tons/cm$^2$ by a rubber press to obtain a molded structure having an approximately cylindrical outer shape.

Figure 3:
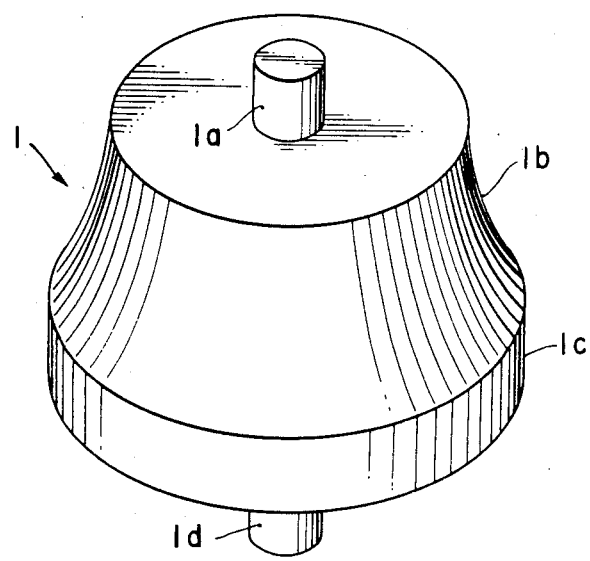
FIG. 3 is a perspective view of a ceramic roughly formed structure from which the rotor of FIG. 1 is produced.

This molded structure is then subjected to turning in a conventional manner to obtain a ceramic roughly-formed structure 1 having an outer shape as shown in FIG. 3 and comprising an upper axial cylindrical projecting portion 1a, a bell-like middle portion 1b having a skirt part flaring outward in the downward direction, a right cylindrical portion 1c, and a lower axial cylindrical projecting portion 1d. The dimension of this ceramic roughly-formed structure exceed those of the final product by from 1 to 3 mm, the differences constituting a finishing allowance in machining to the final external contour of the rotor as shown in FIG. 1 and as a shrinkage allowance for prefiring and final firing as described hereinafter.

The roughly formed structure is then heated in a nitrogen atmosphere to a temperature of the order of from 200° to 600° C. to decompose and remove the paraffin which has served as a binder, and is further prefired for from 30 to 300 minutes at a temperature of from 1,000° to 1,500° C. to obtain a prefired roughly-formed structure or workpiece having a hardness suitable for machining. In the preparation of this prefired formed workpiece, if the roughly formed structure is excessively prefired, severe abrasion of the tool for contouring as described hereinafter will occur, whereas if the prefiring is insufficient, portions of the workpiece formed with thin walls will break during machining.

It is desirable that the prefired roughly-formed workpiece be prefired to such a state that its apparent Mohs' hardness will be lower (by a degree of the order of from 1 to 9) than that of the abrasive particles secured to the tool for contouring as described hereinafter. (The apparent Mohs' hardness is measured by scratching the surface of the workpiece with standard minerals, and includes interparticle bonding strength in addition to the hardness of the ceramic particles per se.)

Figure 4:
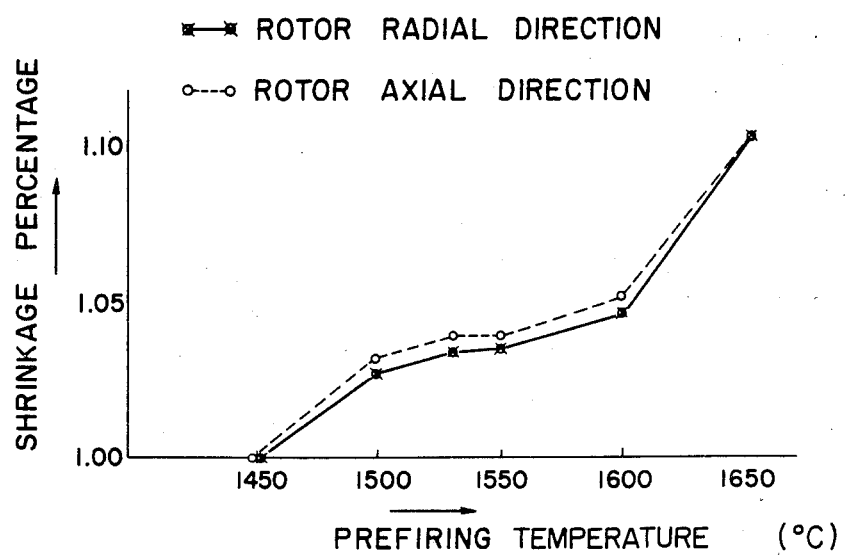
FIG. 4 is a graph showing relations between prefiring temperature and shrinkage percentage.

While the degree of prefiring depends also upon the prefiring time, the prefiring temperature greatly affects the degree of prefiring. In the case of silicon nitride as mentioned above, a prefiring temperature of from 1,470° to 1,490° C. is suitable. The variation of shrinkage percentage of a ceramic formed product with the variation of the prefiring temperature as has actually been observed and measured is indicated in FIG. 4. As can be seen from FIG. 4, the shrinkage percentage (length before prefiring divided by length after prefiring) due to prefiring at a temperature of from 1,470° to 1,490° C. was from about 1.015 to about 1.030.

Figure 5:
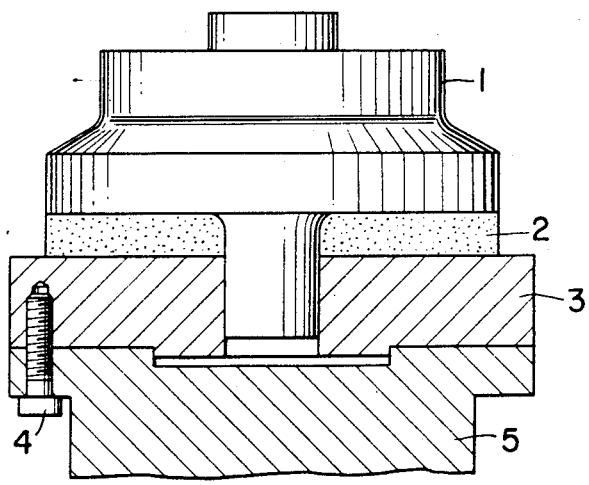
FIG. 5 is an elevation showing the state wherein a prefired ceramic formed structure is mounted on a machine for machining.

If necessary, the smoothing of the lower surface of 1c (and the side surface of 1d) shown in FIG. 3 is then carried out in this step by a turning tool (either a carbide tool or a tool bearing abrasive particles secured thereto) or by buffing. As shown in FIG. 5, these surfaces are coated with an epoxy adhesive to bond together the prefired ceramic roughly formed workpiece 1 and a connection member 2 made of the same material, which is further bonded to a carbon mounting base member 3 in a similar manner, and then this mounting base member 3 is fixed to a jig 5 by bolts 4.

The connection member 2 is used as a reinforcing member for preventing cracking or chipping during the subsequent contouring and is preferably fixed so that it adheres closely to the surfaces of the workpiece before machining. The shape of the connection member and the surface positions thereof closely adhering to the workpiece is suitably determined according to the desired machining. The materials from which the connection member 2 is fabricated are desirably those wherein no rapid change of cutting resistance between the workpiece and the connection member will occur during cutting. Preferably, the material of the connection member is one obtained by treating the same material as the workpiece in the same manner.

The mounting base member 3 is used in order to mount a workpiece to be worked on a machine tool via this member. The material from which the mounting base member is fabricated is one which can be bolted and is of light weight, such as, for example, carbon materials.

It is preferable that the bonding between the workpiece 1 and the connection member 2 and between the connection member and the mounting base member 3 be so carried out that both members can be firmly and positively secured during machining and subsequently removed without any undesirable occurrences such as cracking of the workpiece after working. When the connection member 2 and the mounting base member 3 are secured with an adhesive, these members can be removed from the ceramic product by applying heat after machining to decompose the adhesive.

If necessary, the periphery of the workpiece 1 to which the connection member 2 and the fitting base member 3 are secured is further subjected to machining by turning by a carbide tool so that an excess thickness of from 0.4 to 0.5 mm remains in consideration of allowance for shrinkage due to firing and finishing allowance.

Figure 6:
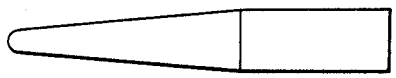
FIG. 6 is a simplified side view of a cutting tool for contouring and abrasive finishing in an embodiment of the invention.

According to the present invention, a conical rod-shaped cutting tool having a shape as schematically shown in FIG. 6 wherein diamond abrasive particles of a particle size of from 80 to 400 mesh are secured at the end portion thereof, is mounted on a simultaneous multi-spindle control, NC machine tool, and each tool is multi-spindle controlled while rotating about its own axis to contour the workpiece into a desired shape. More specifically, the tools for contouring which are suitable for use are those obtained by immersing a tip core material comprising, for example, tool steel into a nickel electrolyte having diamond abrasive particles dispersed therein, depositing a field metal film on the tip core material, and simultaneously electrodepositing diamond abrasive particles on the tip surface together with the metal (i.e., a diamond-electrodeposited tool).

Figure 7A:
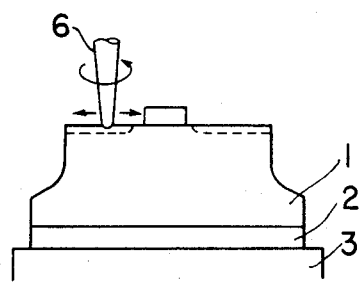
FIGS. 7a through 7d are side views respectively showing the sequential steps of contouring and abrasive finishing in an embodiment of the invention.
Figure 7B:
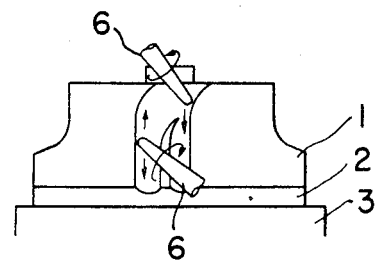
Figure 7C:
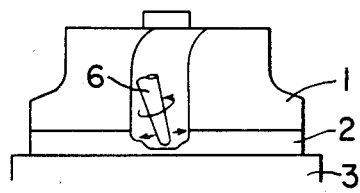

Contouring is carried out, for example, according to the procedure indicated in FIG. 7a through FIG. 7c in the order shown. First, as shown in FIG. 7a, the upper surface of the workpiece 1 is subjected to a fluting process to a depth of about 2 mm in order to prevent separation of the upper surface in the subsequent working to cause cracking in the blade portion.

As shown in FIG. 7b, the portions between the blades are then contoured a plurality of times so that finishing allowances of 0.4 mm and 0.1 mm with respect to the blade faces remain.

Finally, as shown in FIG. 7c, the portions remaining uncut in the preceding step are cut.

By the term "contouring" as used herein is meant a machining process wherein a rod-shaped cutting tool provided with a tip at one end thereof is controllably moved to a desired working position while rotating about its own axis thereby to accomplish sculpturing. The contouring according to the present invention is distinguishable from a conventional turning process involving the rotation or linear movement of the prior art tool.

Figure 7D:
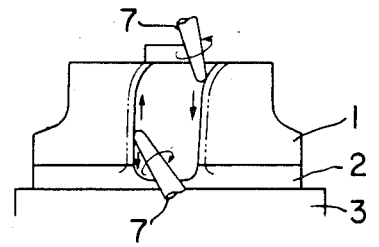

As shown in FIG. 7d, a grinding finishing is applied to the contoured surfaces. In the grinding finishing step, the contoured surfaces are worked in the same manner as in the contouring step except that the cutting tool is a cemented carbide tool such as sintered tungsten carbide.

It is further preferable that the grinding finishing be carried out by using the same shape of the tool and the same machine tool as in the contouring step except for the tip. It is preferable that the tip of this tool be fabricated from sintered or cemented materials comprising mainly tungsten carbide, titanium carbide, aluminum oxide, or the like. The surface roughness after grinding finishing greatly affects the strength of the ceramic product.

The same test piece of silicon nitride ceramic formed product as used in the illustrated embodiment of the invention was worked with a cutting tool with a tip of tungsten carbide (carbide tool) and with a cutting tool with a tip of electrodeposited diamond abrasive grains (electrodeposited tool). The following Table 1 shows surface roughness and bending strength of each test piece worked.

TABLE 1

| Surface roughness ($\mu$) | | Bending strength (Kg/mm$^2$) | |
|---|---|---|---|
| Electrodeposited tool | Carbide tool | Electrodeposited tool | Carbide tool |
| 23 | 7 | 50–60 | 70–80 |

Accordingly, in carrying out the grinding finishing, it is preferable to select a cutting tool such that surface roughness of the finished surface becomes small.

The contouring and grinding finishing steps are successively repeated, thus cutting the portion between each blade portion and an adjacent blade portion. After the forming into a desired shape has been completed, the work assembly is heated to a temperature of 250° C. or more to remove the connection member 2 and the mounting base member 3 from the prefired ceramic workpiece. This workpiece is then fired for 1 to 5 hours at a temperature of from 1,700° to 1,800° C., and finally the surfaces thereof are polished with a diamond grindstone to obtain a ceramic turbine rotor as shown in FIG. 1.

The firing conditions of the ceramic formed article are determined according to the type of the ceramic materials, additives, and the like.

While the process for producing ceramic products according to the present invention has been described with respect to a preferred embodiment of the invention, the process of the present invention can be carried out by modifications of the illustrated embodiment of the invention within the scope thereof. That is, examples of ceramic materials which can be used in the present invention are: silicon nitride as described above; as well as oxides such as $Al_2O_3$, $ZrO_2$ and $Y_2O_3$; nitrides such as BN and AlN; carbides such as SiC, TiC and WC; borides such as $LaB_6$, silicides such as $MoSi_2$; and kaolin. When the ceramic materials are non-plastic, binders such as paraffin are preferably added thereto to provide plasticity. It is necessary that such additives do not give rise to cracking, swelling, foaming, or other undesirable occurrences during heating after forming.

The primary forming may be not only the dry molding described above but also wet molding such as slip or slurry molding.

The rod-shaped cutting tools used in the contouring step have abrasive particles secured to the tip surface thereof. The abrasive particles preferably have a Mohs' hardness of 6 or more, examples of suitable materials being diamond and cubic boron nitride. It is preferable that the abrasive particles be of a particle size of from 80 to 400 mesh. The preferred method of fixing the abrasive particles to the tip surface of the tool comprises, as mentioned hereinbefore, immersing the tip in a metal electrolyte containing the abrasive particles dispersed therein thereby to cause an electric field metal film to adhere to the tip surface, whereby the abrasive particles are fixed together with the field metal film (i.e., electrode position). Depending on the necessity, however, the abrasive particles may be fixed by means of an adhesive such as an epoxy adhesive.

Figure 8:
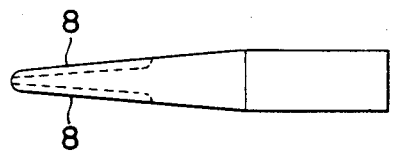
FIG. 8 is a simplified side view of a cutting tool similar to that of FIG. 6 but provided with one or more flutes.

It is also preferable that the tools for contouring have one or more flutes, extending from the portion near the extremity of the tip thereof to a supporting portion thereof, on the surfaces thereof. Such flutes are formed in order to facilitate removal of chips. They are continuously formed in the linear or spiral form from the portion near the extreme end of the tip to the base. The width, depth and shape of the flutes are selected to suit the material to be cut. FIG. 8 illustrates an example of a rod-shaped cutting tool wherein linear flutes 8 are formed.

According to the present invention, ceramic products can be worked and produced into complex shapes by a machining technique. Further, ceramic products having such complex shapes can be produced at low cost in a short period of time.

What is claimed is:

1. A process for producing a ceramic product which comprises:
   providing a jig and means for mounting a workpiece on said jig;
   forming ceramic starting materials into a roughly formed structure;
   prefiring said structure under conditions to produce a formed prefired workpiece having properties suitable for machining thereof;
   mounting said workpiece on said jig via said mounting means in such a manner that said mounting means is detachable from said jig;

contouring by first subjecting the upper surface of the workpiece to a fluting process to a depth sufficient to prevent cracking during subsequent machining, and then by machining said workpiece into a desired shape by means of a cutting tool having a working tip bearing abrasive particles secured to the surface thereof, said cutting tool being rotated;

finishing the contoured surface of said workpiece thus contoured; and firing said workpiece thus finished.

2. The process according to claim 1 wherein said abrasive particles have a Mohs' hardness of 6 or more.

3. The process according to claim 1 wherein said abrasive particles are diamond particles.

4. The process according to claim 1 wherein said abrasive particles have a particle size of 80 to 400 mesh.

5. The process according to claim 1 wherein said means for mounting comprises a connecting member and a mounting member.

6. The process according to claim 5 wherein said connecting member is made of the same material as that of said workpiece.

7. The process according to claim 5 wherein said mounting member is made of carbon material.

8. The process according to claim 6 wherein said mounting member is made of carbon material.

* * * * *